No. 828,332. PATENTED AUG. 14, 1906.
H. McLAUGHLIN.
NUT LOCK.
APPLICATION FILED DEC. 16, 1905.
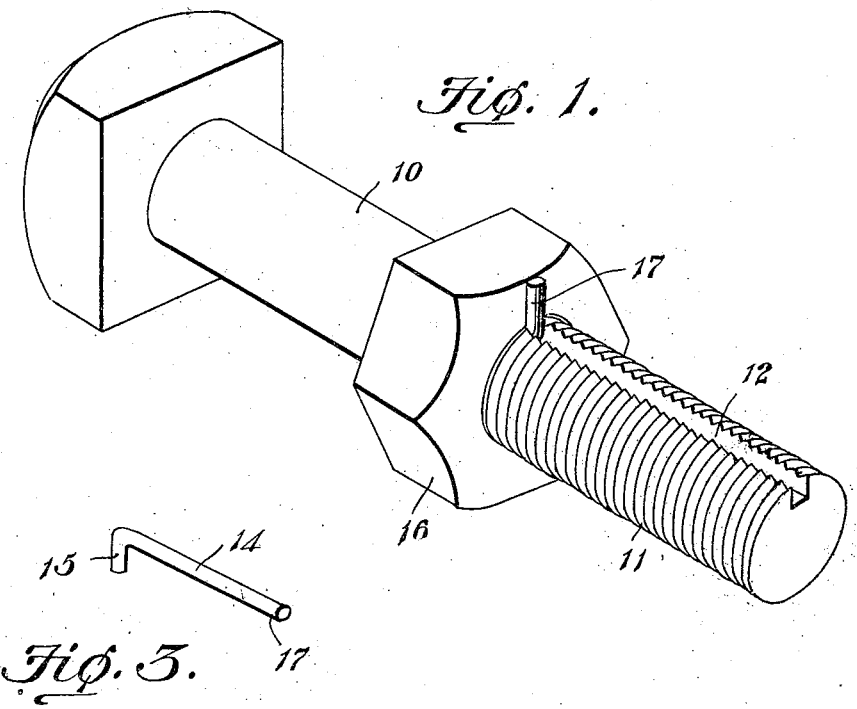
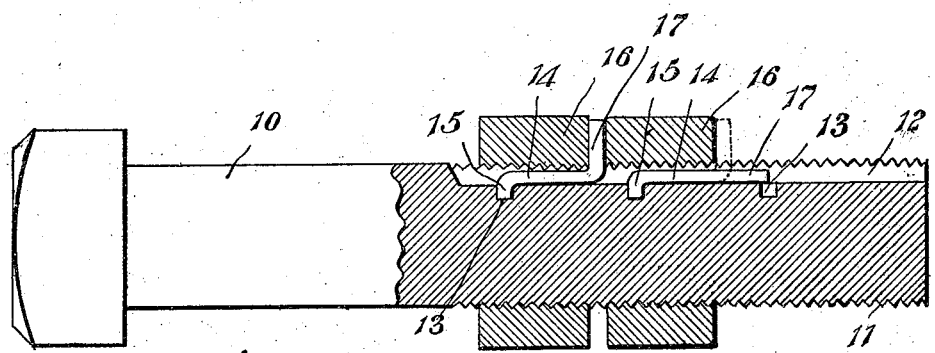
Hugh McLaughlin,
INVENTOR.
WITNESSES:
By
ATTORNEYS

UNITED STATES PATENT OFFICE.

HUGH McLAUGHLIN, OF LOAMI, ILLINOIS.

NUT-LOCK.

No. 828,332.  Specification of Letters Patent.  Patented Aug. 14, 1906.

Application filed December 16, 1905. Serial No. 292,067.

*To all whom it may concern:*

Be it known that I, HUGH McLAUGHLIN, a citizen of the United States, residing at Loami, in the county of Sangamon and State of Illinois, have invented a new and useful Nut-Lock, of which the following is a specification.

This invention relates to nut and bolt locks, and has for an object to cheapen the construction and provide a device of the class embodying new and improved features of convenience, simplicity, strength, and efficiency.

A further object of the invention is to provide a bolt having its thread intersected by a longitudinal slot in the bottom of which are formed sockets and bendable keys with each a hook inserted in a socket and the free end bent, or to be bent, against the outer surface of and to hold the nut.
With these and other ends in view the invention consists in the improved construction and novel arrangement and combination of parts, which will be hereinafter fully described, and particularly pointed out in the claim.

In the drawings, Figure 1 is a perspective view of a bolt embodying the improved lock and showing one nut locked thereon. Fig. 2 is a longitudinal sectional view of a bolt embodying the improved lock and showing one nut locked and another nut in position for locking. Fig. 3 is a perspective view of the key before application.

Corresponding parts in the several figures are indicated throughout by similar characters of reference.

In its preferred embodiment the improved nut and bolt lock forming the subject-matter of this application comprises a bolt 10, of any approved size, length, and form, provided with the screw-threads 11 in the usual manner. Longitudinally of the bolt are formed any approved number of grooves 12, here for clearness of illustration shown as only one, and which number will under ordinary circumstances in ordinary use be found sufficient. The groove 12 is formed throughout the threaded portion of the bolt, and in the bottom of the groove are formed spaced sockets, holes, or depressions 13, the number of such sockets, as well as their size and the intervals therebetween, depending upon the size and length of the threaded portion and the use to which the bolt is to be put. With-
in the groove is a key 14, proportioned to be wholly contained therein and having at one end a hook or offset 15, proportioned to enter and be seated in one of the sockets 13. Upon the threaded portion is disposed a nut 16 of any usual and ordinary form, and the end 17 of the key opposite the hook is capable of being bent without the groove and into binding contact with the outer end of and to hold the nut from a backward movement.

It will be understood that when the key is placed in the groove and the hook within the socket is free the nut is applied and that the hook is placed toward the head of the bolt and at about the limit of movement of the nut. The nut is then applied and screwed tight in the usual manner, after which the free end of the key is bent up, as shown, to bear against and engage the outer surface of the nut.

It will be obvious that the groove and spaced sockets may be formed at the same time the bolt is forged and in the same operation and that the cost will not thereby be increased. Any usual and ordinary nut will be used, and the keys, being very simple and of non-resilient wire, may be manufactured at an almost negligible cost.

If it is desired to remove the nut, the key is simply bent down again into the groove and the nut removed in the usual manner. The keys can generally be used a great number of times, but if broken or lost may be replaced with a new one at practically no expense, or in case of emergency a key may be made on the spot from a small piece of wire, a nail, or the like. It is to be noted that the depressions 13 are spaced apart distances which are less than the length of the keys 14, so that it is always possible to place a key in one of said depressions so that one end of the key can be turned upward and overlap the nut. This is true no matter what position the nut may assume on the threads.

Having thus described the invention, what is claimed is—

The combination with a bolt having a threaded portion intersected by a longitudinally-extending groove disposed wholly within said threaded portion, said groove having a series of recesses in the bottom thereof spaced apart at regular intervals; of a nut mounted on the threaded portion of the bolt and extending across the groove, a key seated within the groove and of greater length than the distance between any two adjoining recesses, said key adapted to be bent to overlap the nut, and an extension at one end of the key, said key being adjustable longitudinally to seat the extension within any one of the recesses and lock the nut against rotation.

In testimony that I claim the foregoing as my own I have hereto affixed my signature in the presence of two witnesses.

HUGH McLAUGHLIN.

Witnesses:
 LARNTINE C. SWEET,
 CHARLES W. JOY.